(12) United States Patent
Martin et al.

(10) Patent No.: US 10,455,393 B2
(45) Date of Patent: Oct. 22, 2019

(54) USING WIRELESS DATA TRANSMISSION TO MAINTAIN INTRISNIC SAFETY OF A GAS METER

(71) Applicant: Natural Gas Solutions North America, LLC, Houston, TX (US)

(72) Inventors: Jeff Thomas Martin, Spring, TX (US); Andrew Logan Perkins, Houston, TX (US)

(73) Assignee: Natural Gas Solutions North America, LLC, Houston, TX (US)

( * ) Notice: Subject to any disclaimer, the term of this patent is extended or adjusted under 35 U.S.C. 154(b) by 0 days.

(21) Appl. No.: 15/869,131

(22) Filed: Jan. 12, 2018

(65) Prior Publication Data

US 2018/0139598 A1 May 17, 2018

Related U.S. Application Data

(63) Continuation-in-part of application No. 15/098,584, filed on Apr. 14, 2016.

(51) Int. Cl.
| | |
|---|---|
| *H04B 5/00* | (2006.01) |
| *H04W 4/80* | (2018.01) |
| *G01D 4/02* | (2006.01) |
| *H04Q 9/00* | (2006.01) |

(52) U.S. Cl.
CPC ............... *H04W 4/80* (2018.02); *G01D 4/02* (2013.01); *H04Q 9/00* (2013.01); *H04Q 2209/43* (2013.01); *H04Q 2209/60* (2013.01)

(58) Field of Classification Search
CPC ..... H04W 4/008; H04W 4/005; H04W 84/12; H04M 2250/02; H05B 37/0272; H05B 33/0872; G01W 1/00; Y02B 70/3266

USPC ........................................ 455/41.1, 41.2, 11.1
See application file for complete search history.

(56) References Cited

U.S. PATENT DOCUMENTS

| | | | |
|---|---|---|---|
| 7,671,480 B2 | 3/2010 | Pitchford et al. | |
| 8,249,500 B2 | 8/2012 | Wilson | |
| 9,041,549 B2 | 5/2015 | McCarty | |
| 9,465,391 B2 | 10/2016 | Gumstrup | |
| 2007/0190939 A1 | 8/2007 | Abel | |
| 2009/0035121 A1 | 2/2009 | Watson et al. | |
| 2009/0105969 A1* | 4/2009 | Saylor ................... | G01D 9/005 702/47 |

(Continued)

OTHER PUBLICATIONS

Ali, et al., "Contactless Smart Card Based Prepaid Gas Metering," Jan. 2014, Proceedings of the 2014 Int. Conference on Industrial Engineering and Operations Management.

(Continued)

*Primary Examiner* — Tu X Nguyen
(74) *Attorney, Agent, or Firm* — Paul Frank + Collins P.C.

(57) ABSTRACT

A gas meter is outfit with near field communication (NFC) devices for in-situ exchange of data. The NFC devices reside in separate compartments. A first compartment houses electronics necessary to generate values for volumetric flow of material in a pipe. The gas meter includes a second compartment with an access point that allows data, including telemetry data, to transmit from the gas meter to a remote device. In operation, the NFC devices exchange data between the first compartment and the second compartment, often through a wall or barrier that prevents flow of fluid between the compartments.

10 Claims, 6 Drawing Sheets

(56) References Cited

U.S. PATENT DOCUMENTS

| | | |
|---|---|---|
| 2011/0320243 A1 | 12/2011 | Khan |
| 2013/0009788 A1 | 1/2013 | Langenberg et al. |
| 2013/0084801 A1 | 4/2013 | Royston et al. |
| 2013/0215467 A1 | 8/2013 | Fein et al. |
| 2014/0055283 A1* | 2/2014 | Ching .................. H04Q 9/00 340/870.02 |
| 2014/0129036 A1 | 5/2014 | Durbhaka et al. |
| 2014/0167978 A1 | 6/2014 | Popa et al. |
| 2014/0339301 A1 | 11/2014 | Angus et al. |
| 2015/0102941 A1* | 4/2015 | Keech .................. H04B 7/145 340/870.02 |
| 2015/0195099 A1 | 7/2015 | Imes et al. |
| 2015/0195394 A1 | 7/2015 | Bietz et al. |
| 2016/0077503 A1 | 3/2016 | Carter |
| 2016/0258549 A1 | 9/2016 | Podpaly et al. |
| 2016/0041539 A1 | 11/2016 | Kemp et al. |

OTHER PUBLICATIONS

Blevins, et al., "Valve control via wireless", Control, Nov. 2015, Putman, Nov. 18, 2015.

Monnier, Monnier, Olivier, "A Smarter Grid with the Internet of Things," Oct. 2013, Texas Instruments.

International Search Report and Written Opinion dated May 8, 2019, in corresponding PCT/US2019/013184.

\* cited by examiner

USING WIRELESS DATA TRANSMISSION TO MAINTAIN INTRISNIC SAFETY OF A GAS METER

CROSS-REFERENCE TO RELATED APPLICATIONS

This application is a continuation-in-part of U.S. Ser. No. 15/098,584, filed on Apr. 14, 2016, and entitled "READING AND WRITING DATA TO A METER THAT MEASURES FLOW OF MATERIAL." The content of this application is incorporated by reference herein in its entirety.

BACKGROUND

Many applications employ metrology hardware. For example, gas meters are ubiquitous in fuel gas distribution and related installations that require accurate, reliable metering of fuel gas. These devices nominally meet certifications or standards that regulatory bodies promulgate under authority or legal framework of a given country or territory. Some standards are in place to protect public interests, for example, to provide consumer protections for metering and billing use of fuel gas. These protections may define units of measure or set thresholds for realization of these units of measure in practice in order to ensure the device generates measurements with appropriate accuracy and reliability. Other standards ensure safe operation of the device. These standards may define design specifications to make devices safe for use with or in proximity to materials that are hazardous or flammable, like fuel gas. However, it is not uncommon that such design specifications may curtail or constrain changes to improve or expand functionality on the device, especially iterations on previously "certified" designs, because of extensive testing that is necessary to obtain appropriate certifications for use in the field.

SUMMARY

The subject matter of this disclosure relates to improvements that expand functionality but maintain the "certified" design of gas meters. Of particular interest herein are embodiments that wirelessly exchange data in-situ across parts of its electronic housing. This feature may, in turn, allow the embodiments to leverage technology, like automated meter reading ("AMR"), to transmit data, including telemetry data, remote from the device to an operator or other facility data repository.

DRAWINGS

Reference is now made briefly to the accompanying drawings, in which.

Figure 1:
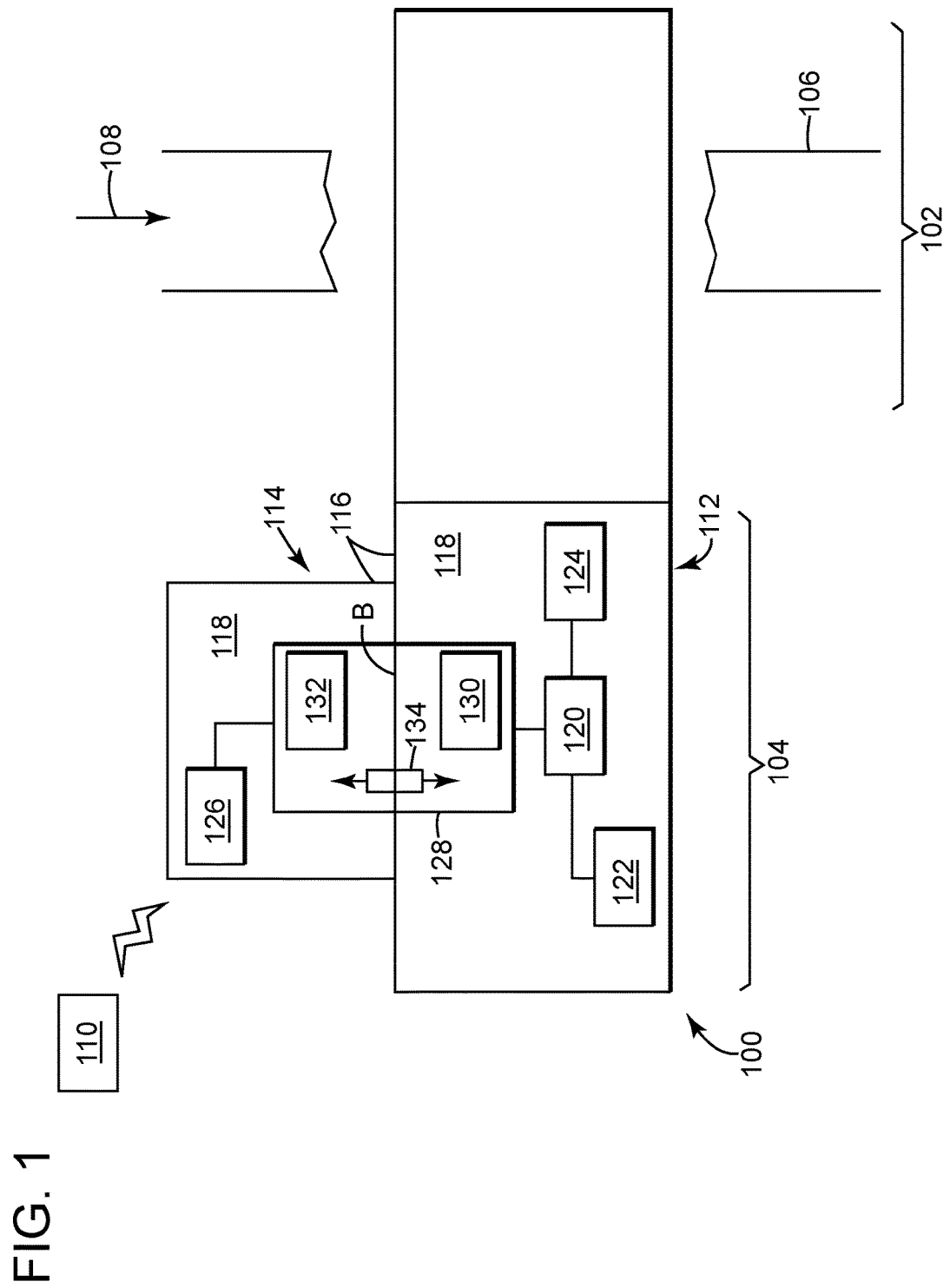
FIG. 1 depicts a schematic diagram of an exemplary embodiment of a gas meter.

Where applicable, like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and may be modified by, for example, reordering, adding, removing, and/or altering the individual stages.

DETAILED DESCRIPTION

Advances in wireless technology have made data exchange much easier. In industry, these advances find use to simplify interfaces that operators leverage to exchange data from industrial devices. Flow controls and flow meters, for example, may include near field communication (NFC) tags that store information that identifies the device. Operators can access the information with a reader device (often handheld) that includes an appropriate NFC reader.

The discussion below describes embodiments that take advantage of this technology as well. These embodiments apply wireless technology to exchange data internally and prior to or "upstream" of an access point, like an antenna. This access point, in turn, may serve to exchange data with a remote device or network. Use of the internal, wireless hardware benefits the design, however, because it adds functionality (e.g., the antenna), but does not compromise integrity of protective enclosures and, notably, does not frustrate certification of the device to meet intrinsically-safe standards.

FIG. 1 depicts a schematic diagram of an exemplary embodiment of a gas meter 100 that can wirelessly exchange data. This embodiment includes a pair of measuring units (e.g., a flow responsive unit 102 and an electronics unit 104). The flow responsive unit 102 may couple with a conduit 106 that carries material 108, for example, fuel gas (used in the discussion that follows). Material 108 may also embody other fluids (e.g., liquids and gasses); and the device may work with solids and solid/fluid mixes as well. The gas meter 100 may exchange data with a terminal 110, sometimes a handheld device. The electronics unit 106 may include separate compartments (e.g., a first compartment 112 and a second compartment 114), each with a peripheral wall 116 that forms an interior space 118. In the space 118 of the first compartment 112, the electronics unit 106 may include a main controller 120 that couples with memory 122 and an input/output 124, like a display or a push-button interface. The space 118 of the second compartment 114 may house a communication unit 126 that can exchange data with the terminal 102. As also shown, the electronics unit 106 may include a signal transfer unit 128 that couples with the main controller 120 and the communication unit 126. The signal transfer unit 128 may include components (e.g., a first component 130 and a second component 132), one resident in each compartment 112, 114. An energy transitory mechanism 134 couples the components 130, 132 together across part of the wall 116, identified as barrier B.

Broadly, the flow device 100 is configured to "wirelessly" exchange data within or inside of the electronics unit 106. These configurations include hardware to facilitate this in-situ exchange of data through the wall 116 that separates the compartments 112, 114. Hardware for short-range wireless connectivity, like near-field communication (NFC) protocols, may be useful for this purpose. This hardware adds functionality to the gas meter 100 at no cost or compromise to safety ratings or certifications necessary to commission use of the gas meter 100. Advantageously, functionality like this also allows the gas meter 100 to exchange key telemetry data (e.g., volumetric flow) and operational data (e.g., tariff rates, error states, fault conditions, etc.) with the terminal 102 via the communication unit 120, itself setup to wirelessly transmit and receive data. This feature forecloses the need for any wires or cables that present practice requires to connect with the electronics unit 104 to extract this type of data (particularly telemetry data) from the electronics unit 106. As an added benefit, absence of the wired connection may simplify construction of the electronics unit 104 because it removes connector ports on the electronics unit 106 that must meet intrinsic-safety requirements, typically by way of galvanic-isolation (which is known to consume parasitic energy that can drawing batteries on-board the gas meter).

Measuring units 102, 104 may interact with one another to measure and quantify volumetric flow rate of the flow of material 108 in conduit 106. The flow responsive unit 102 may include mechanics like impellers, turbines, and diaphragms that interact with the flow of material 108. Alternative configurations may, however, leverage sensors (e.g., temperature sensors, pressure sensors, etc.) or technology (e.g., ultrasonic) that reside proximate flow of material 108. These devices may generate signals in response to local characteristics of material 108. The electronics unit 104 includes electronics to generate the value for the volumetric flow rate. Exemplary electronics may use "non-contact" interfaces to translate movement of the mechanics (e.g., rotation of the impellers) into electrical signals. Part of this interface may reside in each of the units 102, 104, respectively. Other electronics may generate these signals from various processing functions of "sensor signals," noted above. In both cases, the resulting electronic signals may form the basis to bill customers for use of fuel gas.

The terminal 110 may be configured for a variety of data processing functions. These configurations may allow an end user (e.g., a technician) to enter, receive, and visualize data. Handheld implements may be designed specifically to exchange data with the gas meter 100. It may be that a "computing device," like a laptop, tablet, or smart phone, will work as well; but caution is required because these types of devices may not meet appropriate safety standards for use in or in proximity to the material 108 that flow through the gas meter 100.

The compartments 112, 114 may be configured to enclose different components of the gas meter 100. The configurations create independent, sealed environments, effectively to prevent access from one of the compartments 112, 14 into the other. These environments employ construction to ensure that the gas meter 100 meet particular intrinsic-safety requirements. Each may have appropriate seals and closures to prevent ingress of liquids or gasses or egress of sparks, either of which might ignite fuel gas flowing through the gas meter 100.

The peripheral wall 116 may be configured to facilitate these requirements. Nominally, the configurations enclose and protect the components of the electronics unit 106. Barrier B may form a contiguous surface with no ready access points (like openings or apertures) that would couple the interior of compartments 112, 114. This feature effectively prevents flow of fluids (like air) between compartments 112, 114. In this regard, designs may leverage separate, independent pieces for the compartments 112, 114. Plastics are typical materials, although metals or composites may also suffice, for example, to accommodate particular working conditions or environments. Preference may be given to materials that are robust and durable, but also allow fields (e.g., magnetic flux, RF waves, etc.) to pass through in strength sufficient to promote data communication (e.g., as between components 130, 132). The pieces may assemble together to form the completed electronics unit 106. Fasteners like bolts, as well as corresponding threaded inserts, may be useful for this purpose. Quick-release mechanisms like clasps may also provide adequate secure attachment as well.

The main controller 120 may include circuitry outfit to operate as the central "brains" of the gas meter 100. This circuitry may be responsible for data processing functions that occur on the device. As noted above, these functions may generate values for volumetric flow rate of material 108. The device may write this data as "telemetry" data to memory 122, which may comprise RAM or ROM type devices. Other functions may generate an output for display (on, for example, the display 130) or for use in applications that invoice customers, as noted herein.

The input/output unit 124 may be configured to communicate data and information. These configurations may operate as a local user interface to allow the end user (e.g., a technician) to view data, change settings and readouts, and have access to like operative features. This local user interface may leverage a display, like an LCD or VGA screen, to provide visual representations or indicators, typically alpha-numeric values that correspond with data or operational information (e.g., modes) on the gas meter 100. Advanced technology may deploy touch screens to further provide appropriate actuatable inputs, including icons, touch-sensitive buttons, and the like. Physical "push" buttons may work as well, but preference may dictate use of capacitive-touch sensors or buttons that are easier to operate and better maintain the intrinsic safety of the device because they do not require openings in the peripheral wall 116.

The communication unit 126 may be configured to facilitate connectivity with the terminal 110. These configurations may use dedicated radios, or generally "transceivers," that promote two-way data exchanges. Alternatives may use separate devices to receive and to transmit data, as desired. The communication unit 126 may also serve wired connections or serial communication. These connections may permit data to exchange from the gas meter 100 onto various industrial automation networks, including those using Modbus, Fieldbus, or like protocols. The connections may even connect as part of a 4-20 current loop.

The signal transfer unit 128 may be configured to transfer data between the compartments 112, 114. These configurations may employ a "non-contact" transfer modality that penetrates through the peripheral wall 116 (and across the barrier B). Such modality does not require wires or other extenuating connections, which is because these connections may necessarily require openings in the peripheral wall 116 of the first compartment 112 that can frustrate prior certification of this device.

The components 130, 132 may be configured to facilitate the non-contact modality. These configurations may operate so that the mechanism 134, typically a field, conforms to NFC protocols, as discussed above. Other configurations may use magnetic or ultrasonic technologies, or even technologies developed after the date of this writing may also suffice.

Figure 2:
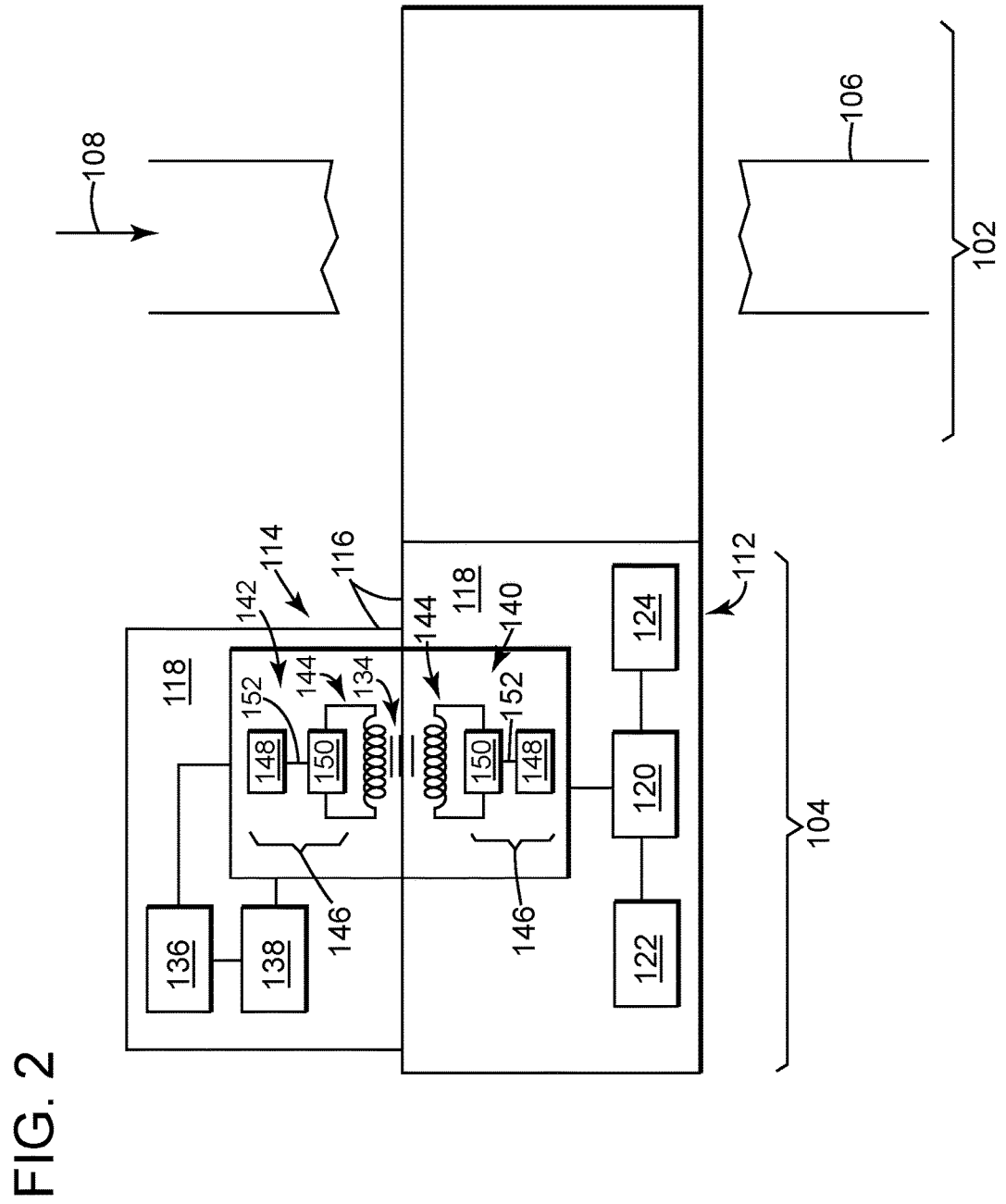
FIG. 2 depicts a schematic diagram of the gas meter of FIG. 1 with exemplary structure to facilitate in situ wireless data exchange.

FIG. 2 depicts, schematically, an example of the gas meter 100 of FIG. 1 with focus on details that implement the field 134 according to NFC protocols for data transfer. The communication unit 126 may comprise a radio 136 and a power source 138. The components 130, 132 may embody a pair of near-field communication (NFC) devices (e.g., a first NFC device 140 and a second NFC device 142). Examples of the NFC devices 140, 142 may include an inductive coil 144, preferably a wound coil of wire (also "winding") made of metal or conductive material. The coil 144 may couple with a data exchange structure 146, possibly an a microcontroller 148 that couples with an NFC tag 150 via a bus 152.

The radio 136 may be configured to facilitate communication with the terminal 110. These configurations may include structure that comports with a wide array of technologies. This structure may generate radio frequencies (RF) that align with automated meter reading (AMR) standards. Exemplary frequencies comport with licensed or public access bands, which may fall in a range of from about 100 MHz to about 5.4 GHz. Actually frequency may depend on local regulatory specifications. Cellular or wireless modem technology may also be used.

The power source 138 may be configured to provide power to operate the radio 136. These configurations may include an energy storage medium or "cell," preferably a rechargeable battery with long lifespan. Multiple cells may be useful to ensure consistent power supply to energize the radio 136.

The NFC devices 140, 142 may be configured to facilitate bi-directional data exchange. These configurations may utilize an "initiator" and a "target." At a high level, the initiator launches the communication protocol and controls the data exchange and the target responds to the requests from the initiator. Bi-directional data exchange as contemplated here may require both of the NFC devices 140, 142 to operate as either the initiator or the target, depending on the directional flow of data between compartments 130, 132.

Coils 144 may be configured to facilitate data exchange between the devices 140, 142 via the field 134. Care should also be taken to locate the coil 144 in position relative to the peripheral wall 116 so as to promote communication between the devices 140, 142. Any position should permit field 134 to readily pass through barrier B. The winding may occupy as much surface area as possible within confines allowable by structure adjacent the devices 140, 142. Moreover, it may benefit use of the disclosed and contemplated concepts to make the coil 144 as large as possible, with as many turns as possible, given any physical limitations for the NFC device 140 in the first compartment 130 and for the NFC device 142 in the second compartment 142. In one implementation, a majority of the winding should be close to the peripheral wall 116, for example, not more than 10 millimeters from the barrier B. It may be useful to encapsulate or conformally coat the coil 144 so as to meet safety and operational requirements.

Use of the NFC devices 140, 142 in proximity to one another may also generate power in the second compartment 132. For example, the NFC device 140 may couple with a power source that is on-board the gas meter 100 (and separate from the power supply 138). Often this power source is a battery that is necessary to power electronics because no access to readily available power is nearby the gas meter 100. Alternatives to the battery may embody an energy "harvester" that can generate power on its own. In either case, power from these in-situ sources can direct power to the second compartment 132 through induction of the adjacent coils 144. This feature may be effective to energize the radio 136 or to recharge the cells of the power supply 138. The proposed design addresses power limitations typical of gas meters 100, but also certain drawbacks that prevail with any potential supplemental power supply, like the power supply 138. For example, certain battery cells (with longer life span or higher duty cycles) might not be viable because they fail to meet safety requirements in hazardous areas (e.g., arcing and sparking concerns) or because the duty cycle of the radio 136 (e.g., short duration at high power) may tend to them rather quickly.

The data exchange structure 146 may be configured to facilitate the bi-directional data exchange. As shown, these configurations may adopt structure to embody peer-to-peer data tags. This type of tag is useful because it can operate in two-way communication using the coil 144, where both the NFC devices 140, 142 can operate as the "initiator" and the "target" depending on the directional flow of data between compartments 130, 132. Generally, the micro-controller 148 may be configured as an integrated circuit that operates the NFC device 140, 142. These configurations may modulate an RF signal (e.g., field 136), for example, a 13.56 MHz or similar proximity RF signal that carries the data messages between the devices 140, 142.

The NFC tag 150 may be configured to retain data that is part of the bi-directional data exchange. For two-way use, the configuration often provides rewriteable memory to afford the device with "dynamic" operation that enables the peer-to-peer data exchange to occur. Industry standards at the time of this writing may limit the size of memory available, for example, to about 2 kilobytes (kB); however this disclosure recognizes this number is likely to increase over time. Data resident on the memory may include various executable instructions or "code" that configure the NFC devices 140, 142 to interact with each other. The instructions may configure the NFC tag 148 to respond to an initialization protocol as a precursor to data exchange between the devices 140, 142. The instructions may also configure the NFC tag 148 to complete a handshake-type protocol or sequence establishing a communication link between the devices 140, 142. This communication link may permit full transfer of data, whether telemetry data, configuration data, or the like.

Figure 3:
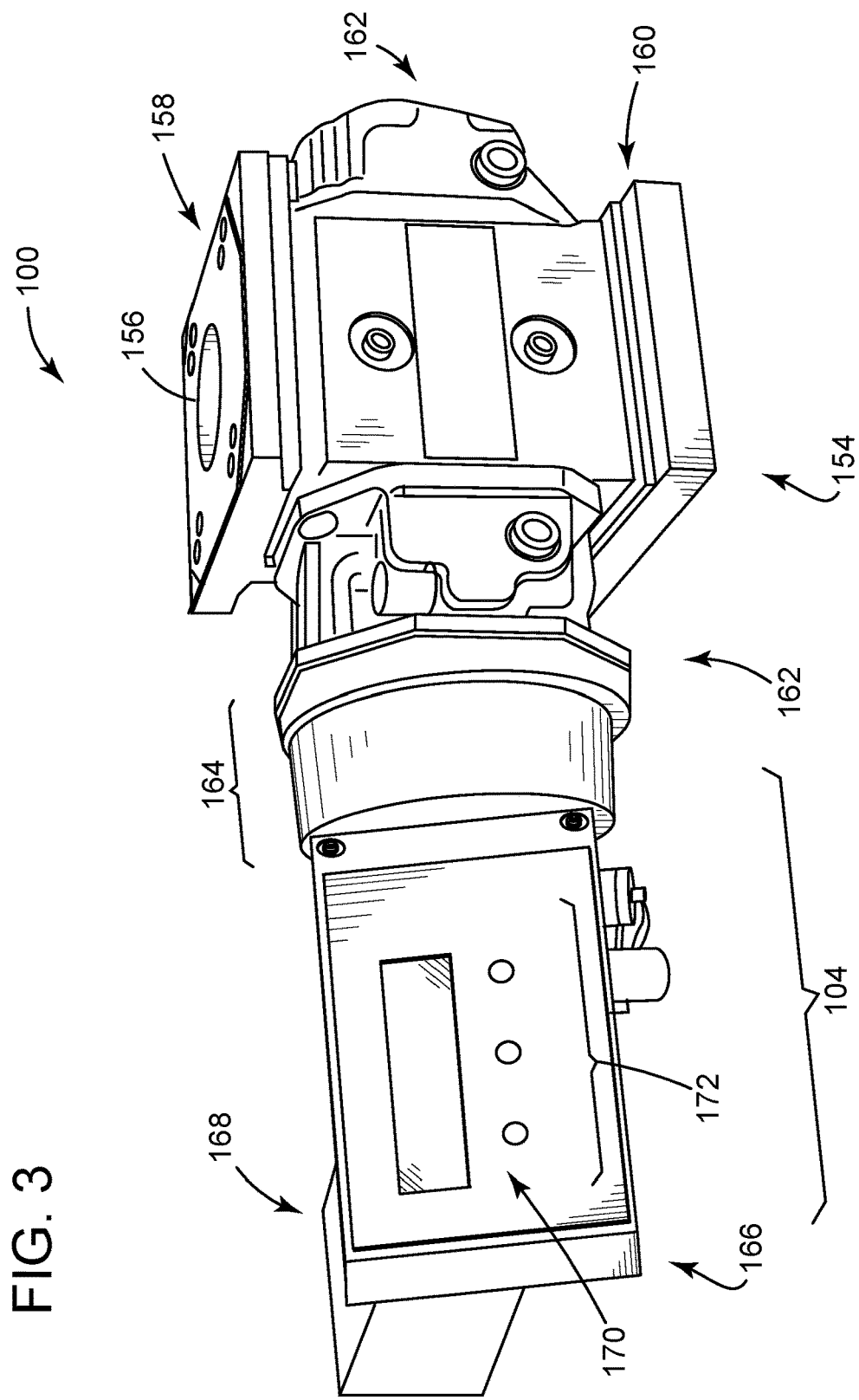
FIG. 3 depicts a perspective view of exemplary structure for the gas meter of FIG. 1.

FIG. 3 depicts a perspective view of exemplary structure for the gas meter 100 of FIG. 1. The structure may include a meter body 154, typically of cast or machined metals. The meter body 154 may form an internal pathway that terminates at openings 156 near flanged ends (e.g., a first flanged end 158 and a second flanged end 160). The ends 158, 160 may couple with complimentary features on the conduit 106, for example, a pipe or pipeline, to locate the meter body 154 in-line. As also shown, the meter body 154 may have a covers 162 disposed on opposing sides of the device. The covers 162 may provide access to the internal pathway, often to expose a pair of impellers resident in the meter body 154. The impellers may counter-rotate in response to the flow of material 108 that passes through openings 156. One of the covers 162 may feature a connection 164, possibly flanged or prepared to interface with the electronics unit 104.

The electronics unit 104 may couple to the connection 164. In this regard, the structure may include housings (e.g., a first housing 166 and a second housing 168), preferably made of plastics or composites. The first housing 166 may have an end that couples with the connection 164. The second housing 168 may couple with the first housing 166, as noted above. An internal annular seal, like an o-ring, may reside between the housings 166, 168 to seal and prevent ingress of fluid into the second housing 168. The housings 166, 168 may be fashioned with mechanical features for this purpose as well. The housings 166, 168 create an enclosure to contain and protect electronics including the NFC devices 140, 142 and circuit board 120 (discussed above). The first housing 166, or "index housing," may also support a display 170 and user actionable device 172, the latter being used to interface with interior electronics to change the display 170 or to operate other operative features of the electronics unit 104.

Figure 4:
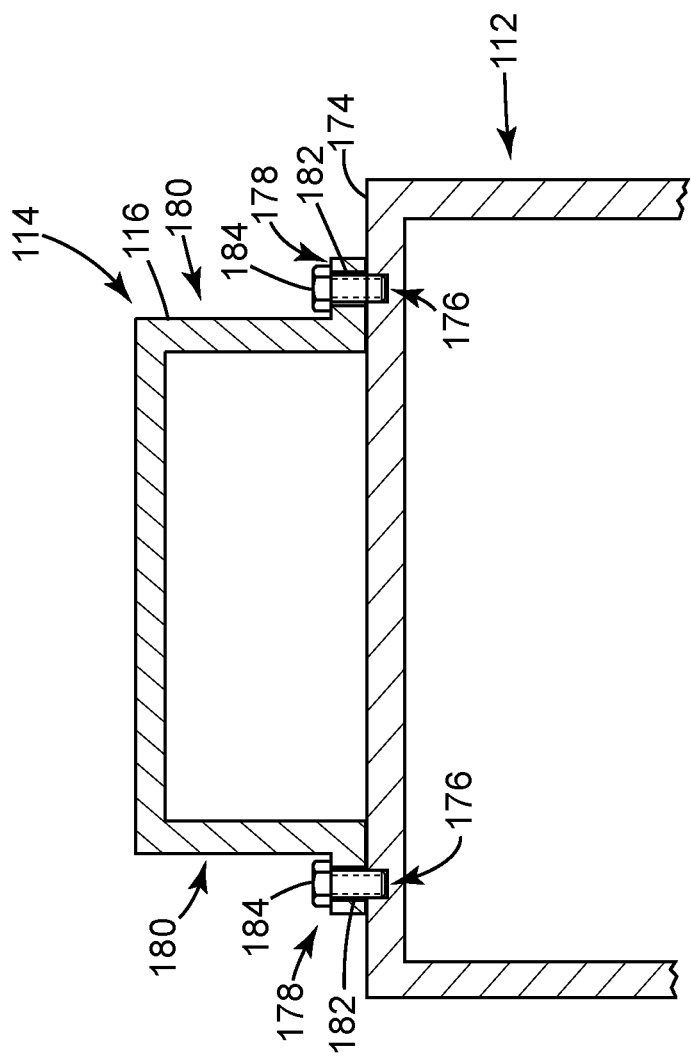
FIG. 4 depicts an elevation view of a cross-section of the gas meter of FIG. 3.

FIG. 4 depicts a schematic diagram to illustrate an exemplary construction of the housings 166, 168 in cross-section. On the first housing 166, the peripheral wall 116 may form a back panel 174 that includes threaded areas 176, for example, openings with interior threads or threaded inserts. The threaded areas 176 preferably terminate within the peripheral wall 116 with no access to the interior space 118 of the first compartment 112. This feature avoids additional access points that can frustrate intrinsic safety of the electronics unit 104. The second housing 166 can mount to the back panel 174. For example, the peripheral wall 116 may form a flange 178 that extends from one or more sides 180. The flange 178 may include openings 182 that penetrate through the peripheral wall 116 to align with the threaded areas 176 to secure the second housing 168 in position on the first housing 166. Fasteners 184 may extend into the threaded areas 174 for this purpose.

Figure 5:
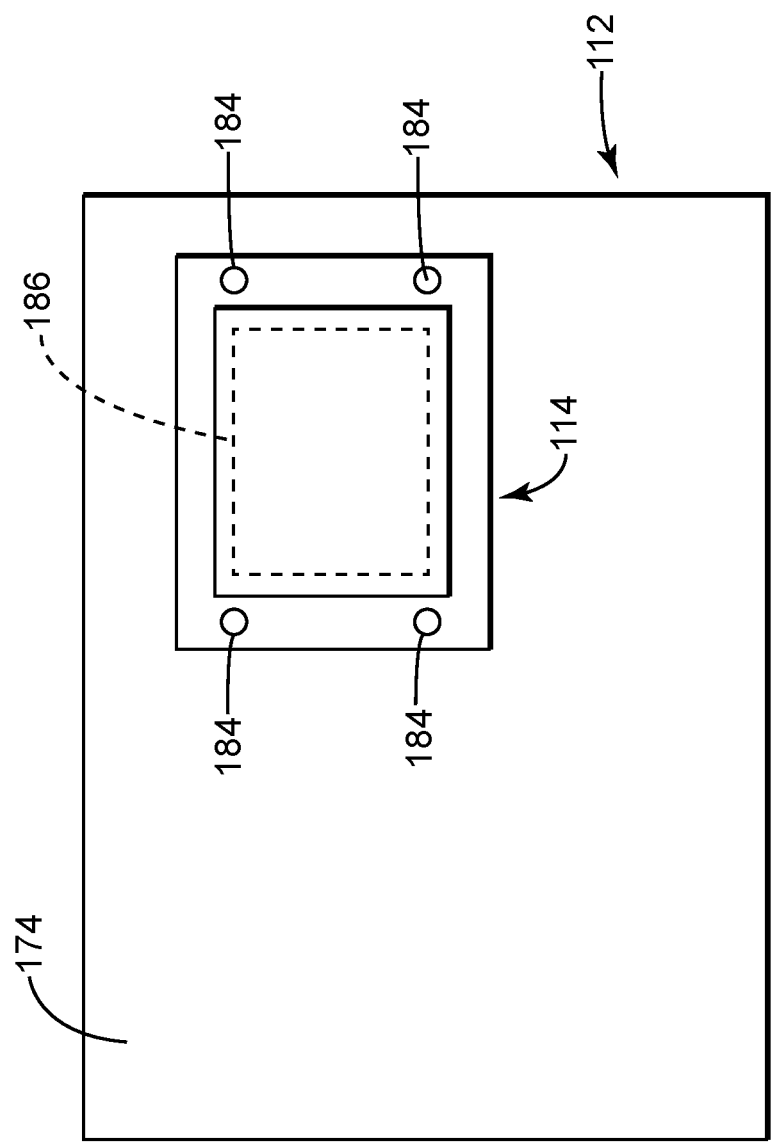
FIG. 5 depicts an elevation view of the back of the gas meter of FIG. 3.

FIG. 5 depicts an elevation view of the back panel 174 of the housings 166, 168 of FIG. 4. The sides 180 may form integrally (or monolithically) to bound a portion 186 of back panel 174. The portion 186 corresponds with the barrier B that separates the interior space 118 of the compartments 112, 114. The back panel 174 is free of access points in the portion 186 to promote appropriate intrinsic safety, at least of the first housing 166. It may further benefit the design for the flange 178 (or second housing 168) to include a groove (not shown) that receives an o-ring or gasket to ensure proper seal to the back panel 174.

Figure 6:
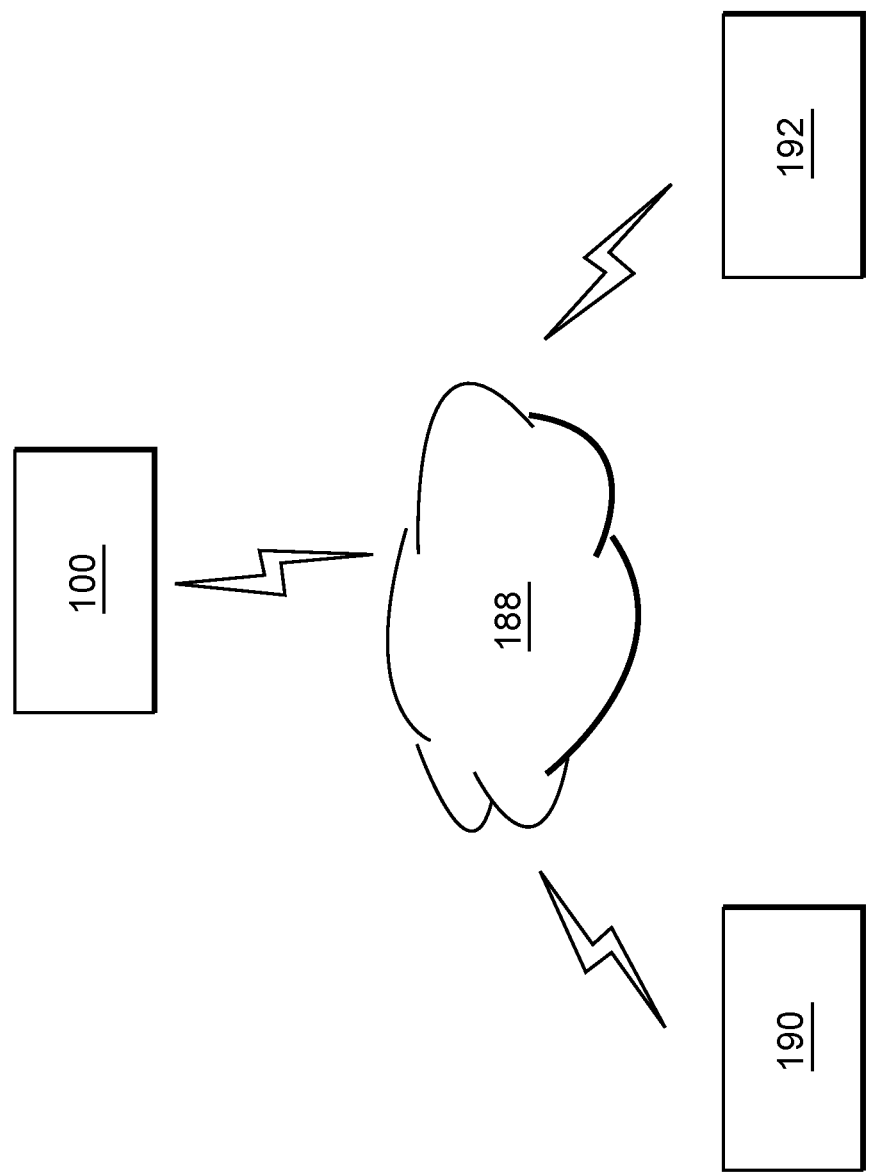
FIG. 6 depicts a schematic diagram of the gas meter of FIG. 1 as part of a network system.

FIG. 6 shows an example of a network 174 that can also facilitate data exchange with the gas meter 100. The gas meter 100 may connect (as a connected device or access point) with a larger system of inter-networked devices and components, like the network 188. In one implementation, the network 188 may connect with a server 190 and a computing device 192. Other devices may also connect as well. In one implementation, the network 188 permits transfer of data, information, and signals by way of wireless protocols. The network 188 may find use to allow access to the gas meter 100 from the terminal 110 or the computing device 192, for example, to obtain diagnostic information, configure and calibrate the gas meter 100 from a central office, perform status checks, perform maintenance, and like tasks. Data obtained from the gas meter 100 could be shared with other individuals remote from the gas meter 100 or the computing device 192 throughout the network 188.

In view of the foregoing discussion, the improvements herein facilitate data exchange between the gas meter 100 and other, connected devices. The embodiments may leverage NFC components that are internal to the electronics on the gas meter 100. These components allow for ready data transfer without the need for extensive "re-certification" of the gas meter 100. The gas meter 100 may cooperate with remote computing devices or terminals, which together can form a system that serves as a valuable configuration and diagnostic tool for the gas meter. Bi-directional data exchange can allow data entry on the terminal to modify data resident on the gas meter 100. This data may define one or more operating parameters for the gas meter 100. Exemplary parameters may be part of setup that regulates operation of the gas meter 100, for example, calibration settings that are set at the time the device is installed at the location. Bi-directional data exchange may also allow the terminal to retrieve telemetry and the like operating data without the need for wires or cables that directly connect to the gas meter 100.

The improvements open up a wide array of use cases for the NFC-enabled gas meter. In one implementation, a technician may approach the gas meter 100 (at customer site or on distribution pipeline or branch) to interrogate it for maintenance or other diagnostics. The technician can bring the terminal (or other "handheld" computing device) within close proximity to the gas meter 100. This location can stimulate data exchange across the barrier B via the NFC field, either via the AMR antenna or via direct stimulation of the NFC devices. For the latter, proximity of the terminal to the NFC devices likely needs to fall within a threshold distance that corresponds with the construction of NFC devices or NFC protocol standards. Inductive coupling between the coils may occur at distances from 0 to about 20 cm. But in practice the best distance for inductive coupling may occur from 0 to about 5 cm, so the threshold distance may be within a range of about 0 to 5 cm for reliable communication between the terminal and the NFC devices on the gas meter 100. NFC standards provide proper RF signal format and modulation, as well as proper coding schemes for the data to be transferred on the RF signal (e.g., Manchester coding format, 10% modulation, and amplitude shift keying as the format for the NFC modulation). Depending upon the chosen coding scheme, data transfer rates may be one of 106, 212 or 424 kbps, but this is does not limit transfer in scope as other technology may be developed to increase transfer in appropriate formats.

This written description uses examples to disclose the invention, including the best mode, and also to enable any person skilled in the art to practice the invention, including making and using any devices or systems and performing any incorporated methods. An element or function recited in the singular and proceeded with the word "a" or "an" should be understood as not excluding plural said elements or functions, unless such exclusion is explicitly recited. References to "one embodiment" of the claimed invention should not be interpreted as excluding the existence of additional embodiments that also incorporate the recited features. Furthermore, the claims are but some examples that define the patentable scope of the invention. This scope may include and contemplate other examples that occur to those skilled in the art. Such other examples are intended to be within the scope of the claims if they have structural elements that do not differ from the literal language of the claims, or if they include equivalent structural elements with insubstantial differences from the literal language of the claims.

Examples appear below that include certain elements or clauses one or more of which may be combined with other elements and clauses describe embodiments contemplated within the scope and spirit of this disclosure.

What is claimed is:
1. An apparatus, comprising:
a flow responsive unit with mechanics that interact with flow of material in a pipe, the flow responsive unit having a cover sealing the mechanics and forming a connection; and
an electronics unit coupled with the connection and fluidly-sealed from the mechanics of the flow responsive unit, the electronics unit generating a value for volumetric flow rate for flow of material in the pipe, the electronics unit comprising,
a first housing attached to the connection;

a second housing attached to the first housing, wherein a peripheral wall of the first housing separates a first compartment of the first housing and a second compartment of the second housing to prevent flow of fluid between them;

a signal transfer unit disposed in each of the first compartment and the second compartment to wirelessly transmit data through the peripheral wall; and an antenna disposed in the second compartment and connected directly to the signal transfer unit, wherein the signal transfer unit comprises a pair of components that bi-directionally exchange data with each other, one each disposed in the first compartment and the second compartment and separate from one another by the peripheral wall, and each being configured to operate both as an initiator that controls data exchange and a target that responds to requests for data from the initiator.

2. The apparatus of claim 1, wherein the electronics unit comprises a battery in the second compartment with a wired connection to the signal transfer unit.

3. The apparatus of claim 1, wherein the signal transfer unit includes a component that generates a field in each of the first compartment and the second compartment.

4. The apparatus of claim 1, wherein the signal transfer unit comprises inductive coils.

5. The apparatus of claim 1, wherein the signal transfer unit comprises a pair of inductive coils, one each disposed in the first compartment and the second compartment proximate the peripheral wall.

6. The apparatus of claim 1, wherein the signal transfer unit comprises a pair of dynamic NFC tags, one each disposed in the first compartment and the second compartment proximate the peripheral wall.

7. The apparatus of claim 1, wherein the peripheral wall forms a contiguous surface that is free of openings proximate the signal transfer unit.

8. A gas meter, comprising:
a meter body with mechanics disposed therein and a cover that seals the mechanics and forms a connection;
a first housing coupled with the connection of the meter body and fluidly-sealed from the mechanics;
a second housing fastened to the first housing so that a wall of the first housing creates a barrier that prevents flow of fluid between interior space of the first housing and the second housing;
a signal transfer unit with first and second components comprising inductive coils, one disposed in each of the first housing and the second housing proximate the barrier; and
an antenna disposed in the second housing and connected directly to the signal transfer unit,
wherein the first and second components bi-directionally exchange data with each other, and both operate as an initiator that controls data exchange and a target that responds to requests for data from the initiator.

9. The gas meter of claim 8, further comprising:
a battery disposed in the second housing and coupled with the inductive coils.

10. The gas meter of claim 8, further comprising:
an NFC tag disposed in each of the first housing and the second housing and coupled with the inductive coils.

* * * * *